United States Patent
Herbrich et al.

(10) Patent No.: US 9,208,189 B2
(45) Date of Patent: Dec. 8, 2015

(54) DISTRIBUTED REQUEST PROCESSING

(75) Inventors: Ralf Herbrich, Mountain View, CA (US); Iouri Y. Putivsky, Cupertino, CA (US); Antoine Joseph Atallah, Bellevue, WA (US)

(73) Assignee: Facebook, Inc., Menlo Park, CA (US)

( * ) Notice: Subject to any disclaimer, the term of this patent is extended or adjusted under 35 U.S.C. 154(b) by 313 days.

(21) Appl. No.: 13/594,690

(22) Filed: Aug. 24, 2012

(65) Prior Publication Data
US 2014/0059163 A1 Feb. 27, 2014

(51) Int. Cl.
G06F 15/16 (2006.01)
G06F 17/30 (2006.01)
G06F 9/50 (2006.01)
G06F 9/52 (2006.01)
H04L 29/08 (2006.01)

(52) U.S. Cl.
CPC ........ G06F 17/30348 (2013.01); G06F 9/5055 (2013.01); G06F 9/526 (2013.01); *G06F 2209/5015* (2013.01); *G06F 2209/523* (2013.01); *H04L 67/10* (2013.01); *H04L 67/1095* (2013.01)

(58) Field of Classification Search
USPC .................... 709/220, 217; 707/737; 705/318
See application file for complete search history.

(56) References Cited

U.S. PATENT DOCUMENTS

| | | | |
|---|---|---|---|
| 6,873,982 B1 * | 3/2005 | Bates ................ | G06F 17/30648 707/737 |
| 8,583,614 B1 | 11/2013 | Dilts et al. | |
| 2005/0120061 A1 | 6/2005 | Kraft | |
| 2006/0010103 A1 | 1/2006 | Malik | |
| 2006/0136381 A1 * | 6/2006 | Glaser ............... | G06F 17/30864 |
| 2006/0136513 A1 | 6/2006 | Ngo et al. | |
| 2007/0112586 A1 | 5/2007 | Dettinger et al. | |
| 2008/0243847 A1 | 10/2008 | Rasmussen | |
| 2009/0043593 A1 * | 2/2009 | Herbrich ............ | G06Q 30/0185 705/318 |
| 2009/0077130 A1 | 3/2009 | Abernethy et al. | |
| 2009/0100209 A1 | 4/2009 | Szabelski | |
| 2009/0274158 A1 | 11/2009 | Sharp et al. | |
| 2010/0174783 A1 | 7/2010 | Zarom | |
| 2011/0184778 A1 * | 7/2011 | Graepel ................. | G06N 7/005 705/7.31 |
| 2013/0097117 A1 | 4/2013 | Lasky et al. | |
| 2013/0226872 A1 | 8/2013 | Barefoot et al. | |
| 2014/0053227 A1 | 2/2014 | Ruppin et al. | |

OTHER PUBLICATIONS

Graepel et al., Web-Scale Bayesian Click-Through Rate Prediction for Sponsored Search Advertising in Microsoft's Bing Search Engine, Proceedings of the 27th International Conference on Machine Learning, 2010.

* cited by examiner

Primary Examiner — Tammy Nguyen
(74) Attorney, Agent, or Firm — Van Pelt, Yi & James LLP

(57) ABSTRACT

Processing a request is disclosed. A request associated with a first identifier is received. A selected request handler is selected among a first plurality of request handlers to process the request. The selection of the selected request handler is based at least in part on the first identifier. The request is processed using a second identifier included in the request. Processing the request includes using a local version of a data associated with the second identifier and stored in a storage managed by the selected request handler. The local version of the data has been updated using a centralized version of the data. The centralized version of the data has been determined using processing performed by a second plurality of request handlers. The selected request handler is included in the second plurality of request handlers.

20 Claims, 10 Drawing Sheets

US 9,208,189 B2

DISTRIBUTED REQUEST PROCESSING

BACKGROUND OF THE INVENTION

When data may be accessed and updated simultaneously, locks are used to prevent data from being accessed in an inconsistent state. For example, if data is changed while the data is being read, incorrect data may be read. Additionally, if two writers of the data simultaneous try to update the data, the data may be left in an inconsistent state. A lock may be used to serialize the reading and writing of data to solve these issues. However, utilizing locks requires a reader and writer of the data to wait until another reader or writer has released a lock. In situations where the data needs to be constantly updated and read, utilizing locks may be inefficient or impractical due to the volume of read and write requests for the data. For example, in a system that predicts the probability that a particular type of user will select a particular content, the probability is being constantly updated based on observed selection behavior of users as well as accessed to determine whether to display the particular content to a user of the particular type. It is often inefficient and impractical to utilize a single lock to protect a constantly updated and accessed data. Therefore, there exists a need for a better way to change and access data on a larger scale.

BRIEF DESCRIPTION OF THE DRAWINGS

Various embodiments of the invention are disclosed in the following detailed description and the accompanying drawings.

DETAILED DESCRIPTION

Figure 1:
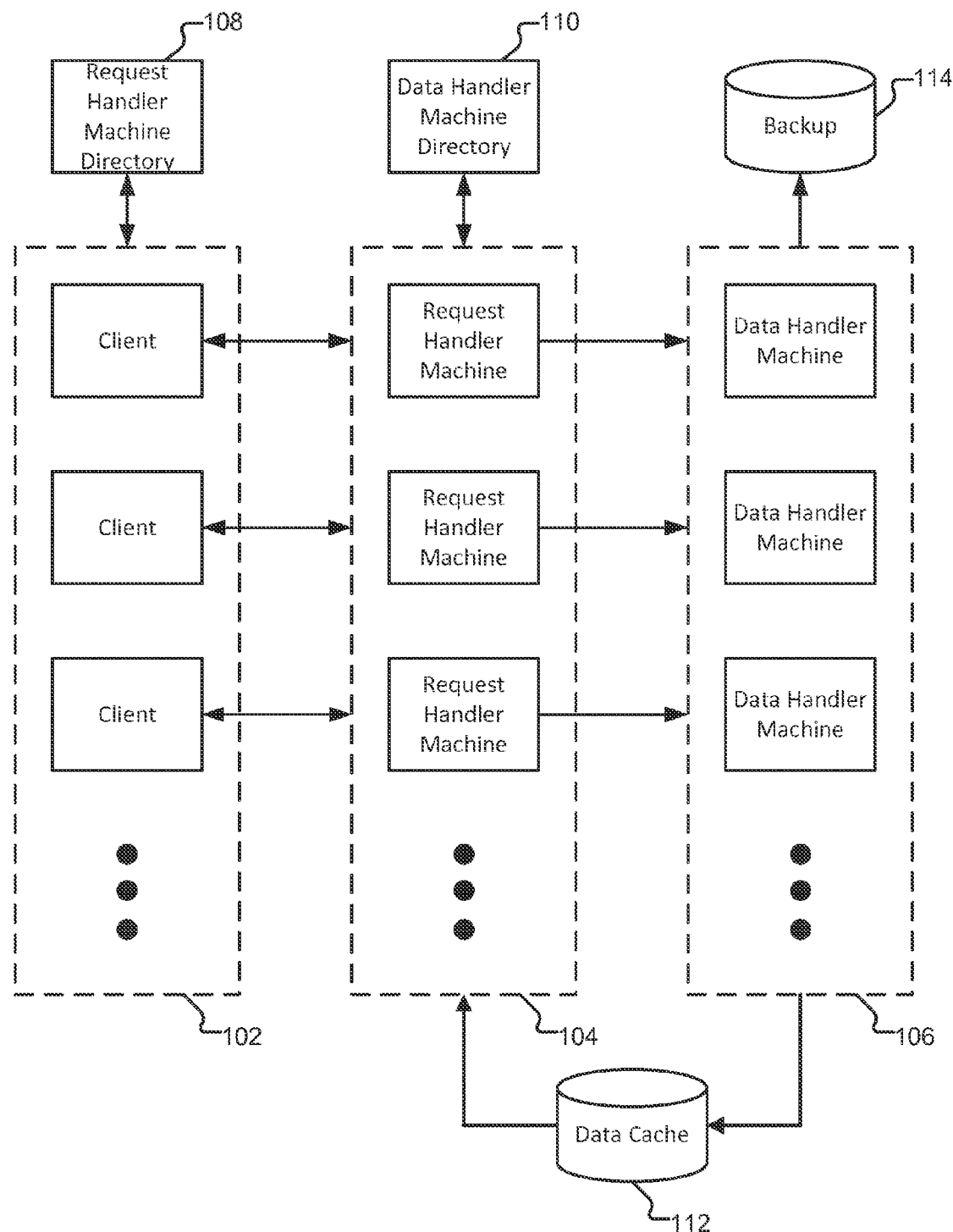
FIG. 1 is a flowchart illustrating an embodiment of a system for processing requests.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Processing a request is disclosed. In some embodiments, the request may include a request to update data or a request to obtain data. For example, the request may include a request to obtain a probability associated with whether a user of a certain demographic will select certain content (e.g., advertisement). In another example, the request includes a request to update the probability statistic using a Bayesian learning algorithm. In various embodiments, the request is processed in a distributed computing environment. For example, a probability model statistic is to be obtained and updated based on events they take by a large number of users. One of the simplest implementations would be to have a single lock control the access and update of the probability model statistic to prevent errors caused by a read or update of the probability model statistic while the probability model statistic is being updated. However, in an environment where a large number of users will be accessing and updating the probability model statistic, it would be extremely inefficient to provide the probability model statistic from a single storage location using a single lock that can become a bottleneck point.

In some embodiments, rather than using a single storage location controlled by a single lock, the storage and processing of the data of interest is distributed across a plurality of storage locations and machines. A first set of one or more machines processes requests using one or more locally stored versions of the data. Because there exists more than one location where the data is stored, competition for the data is reduced by a factor proportional to the number of locally stored versions. Each locally stored version of the data is locally updated and used to serve requests from clients. A second set of one or more machines receives prepared data updates processed by the first set of machines and maintains a centralized version of the data. This centralized version is used to periodically update the locally stored versions of the first set of machines. For example, by receiving the prepared updates processed by the first set of machines and combining the prepared updates into a centralized version of the data, the prepared updates can be shared across all the locally stored versions of the first set of machines when the centralized version is used to periodically update the locally stored versions of the first set of machines. In-between the updates using the centralized version, each locally stored version may contain different data due to different local updates to each local version that has not yet been reflected in the centralized version to update the local versions. In some embodiments, the requests serviced using the locally stored versions must be tolerant of this data variation and delay in the update from the centralized version.

In some embodiments, the received request is associated with a first identifier. For example, the received request includes a user identifier. Using the first identifier, a selected request handler is selected among a first group of request handlers to process the request. An example of the request handler includes a thread/process that is able to process data and store/retrieve data from storage (e.g., storage storing local versions of the data) of the request handler. A plurality of request handlers may be hosted by a single machine. The received request is processed by the request handler using a second identifier included in the request. For example, the second identifier includes a hash value that uniquely identifies data to be updated or obtained. Processing the request includes using a local version of the data associated with the second identifier. The local version of the data may be obtained from storage of the selected request handler. The local version of the data is associated with a centralized version of the data and the centralized version of the data has been determined using processing performed by a second group of request handlers. The selected request handler is included in the second group of request handlers.

In some embodiments, when processing a prepared update from the first set of machines associated with the locally stored versions of data of interest, a data identifier, such as the hash value that uniquely identifies data of interest, is used to select among a plurality of data handlers a selected data handler that uses the received data update to update a centralized version of the data. The centralized version of the data is used to update one or more locally stored versions of the data at an interval different from the interval the updates are received from the first set of machines.

In various embodiments, processing the request and data described below are performed in the context of predicting an outcome using a Bayesian learning system. For example, the system is updated/trained using observed outcomes of an event given one or more feature variables of the event. An example of predicting an outcome includes predicting whether content (e.g., advertisement, notification, news, message, etc.) will be of interest to a user. Using the observed outcomes, one or more statistics describing belief about weights associated with the feature variables (e.g., demographics of a user, time, location, search terms, past behavior, information about content provided, etc.) associated with providing the content are generated. The weights may be used to determine how much each feature may influence a prediction to be made. The statistics may be obtained for a proposed event to determine a probability of a specified outcome with the same one or more feature variables. As additional event outcomes are observed, the probability model statistics may be updated to reflect the event outcomes. In such a Bayesian learning system, it would be desirable to be able to simultaneously train and generate predictions on a massively parallel scale in real time. Additional background on Bayesian prediction and learning systems described through the specification may be found in patent application Ser. No. 11/835,985 titled EVENT PREDICTION and a reference entitled WEB-SCALE BAYESIAN CLICK-THROUGH RATE PREDICTION FOR SPONSORED SEARCH ADVERTISING IN MICROSOFT'S BING SEARCH ENGINE (Proceedings of the 27th International Conference on Machine Learning (ICML-10), Jun. 21-24, 2010, Haifa, Israel 13-20).

FIG. 1 is a flowchart illustrating an embodiment of a system for processing requests. A client in group 102 communicates with a request handler machine in group 104 to process one or more requests associated with data of interest. An example of the data of interest includes data that is being continually updated as additional information about the data is received. In some embodiments, the client request includes a request to obtain data and/or a request to update data. For example, the client request includes a request to obtain probability model statistics associated with a probability of a future outcome and/or information about a past outcome that can be used to update prediction statistics. In some embodiments, the client determines which request handler machine should handle the client request using request handler machine directory 108. An example of directory 108 includes one or more clusters of servers running Zookeeper of the Apache Software Foundation. Each request handler hosts one or more request handlers that process requests from one or more clients. All requests from a single client/user may be handled by the same request handler. In some embodiments, load balancing and fault tolerance in handling client requests may be achieved by dynamically mapping a request handler to a request handler machine using directory 108. For example, a client/user requests from request handler machine directory a location identifier of a request handler machine that is assigned to host the request handler assigned to the client/user.

A request handler machine in group 104 hosts a request handler that processes a request from a client/user. For example, the request includes a request to obtain data and the data may be obtained from a local storage of the request handler. In another example, the request includes a request to update data. Using information in the request, the data is updated in the local storage of the request handler and an update of the data is prepared to be sent to a data handler that updates a centralized version of the data using the prepared update. A plurality of request handlers hosted by one or more of the request handler machines in group 104 may be processing different local versions of the same data. For example, the data is a statistical value associated with a probability a certain user type will select a specified content and a plurality of request handlers are accessing and updating local versions of the statistical value.

In some embodiments, a single data handler is assigned to receive and process all updates associated with a certain data. For example, all the prepared updates for same data by the one or more request handlers are processed at the same data handler. One or more data handlers are hosted by each data handler machine in group 106. A destination data handler machine for a prepared update of a request handler may be determined using data handler machine directory 110. For example, directory 110 is sent a data identifier and directory 110 sends an identifier of a data handler machine assigned to process the data. Directory 110 provides load balancing and fault tolerance of functionalities. An example of directory 110 includes one or more clusters of servers running Zookeeper of the Apache Software Foundation. Using an identifier of the determined data handler machine, a request handler machine sends the prepared update to the specified data handler machine. A data handler of the specified data handler machine processes the prepared update and updates a centralized version of the data of interest. A data handler may be assigned handle processing for a plurality of different data. Prepared updates from request handlers may be batched and/or combined before being sent to a data handler machine. The updated centralized version of the data by a data handler may be stored in data cache 112. Data cache 112 may include a storage such as memory and/or database storage. For example, data cache 112 includes a fast access distributed memory caching system such as Memcached/Memcache. In another example, data cache 112 includes a distributed file system such as a Hadoop Distributed File System (HDFS) of the Apache Software Foundation. The updated centralized version of the data is periodically sent to one or more request handlers of request handler machines in group 104 and the local versions of the data associated with these request handlers is updated using the centralized version of the data. A data handler of data handler machines in group 106 also periodically performs a backup of the centralized version of data to backup storage 114. An example of backup storage 114 includes a distributed file system such as a HDFS.

In the example shown in FIG. 1, portions of the communication path between the components are shown. Other communication paths may exist and the example of FIG. 1 has been simplified to illustrate the example clearly. The components of FIG. 1 may communicate with another component via a network. Examples of the network include one or more of the following: a direct or indirect physical communication connection, mobile communication network, Internet, intranet, Local Area Network, Wide Area Network, Storage Area Network, and any other form of connecting two or more systems, components, or storage devices together. Although a different number of components have been shown to simplify the diagram, additional components shown in FIG. 1 may exist. Components not shown in FIG. 1 may also exist.

Figure 2A:
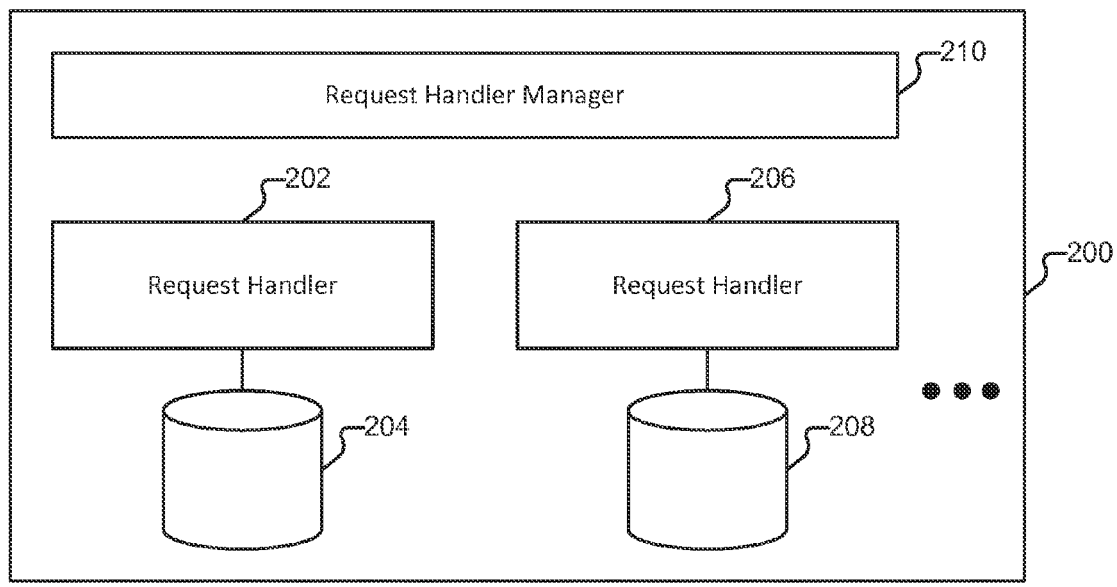
FIG. 2A is a block diagram illustrating an embodiment of a request handler machine.

FIG. 2A is a block diagram illustrating an embodiment of a request handler machine. In some embodiments, request handler machine 200 is included in a request handler machine included in group 104 of FIG. 1. Machine 200 includes a plurality of request handlers, including request handler 202 and request handler 206. Any number of request handlers may exist. Each request handler processes requests from one or more assigned clients/users and/or assigned requests. The assignment of requests handled by a request handler may be predetermined and/or dynamically determined based on factors such as load balancing and fault tolerance. Each request handler is able to process data and is associated with a local storage such as a memory and/or a database. For example, request handler 202 is associated with (e.g., manages) storage 204 and request handler 206 is associated with storage 208. The associated storage may store local versions of data of interest being requested and/or updated. The local version of data may be protected with a lock to prevent data corruption when the data is being updated. In some embodiments, the local version of the data is periodically refreshed with an updated data from a centralized version of the data. An example of the request handler includes a thread/process that is able to process data and store/retrieve data from the associated storage.

Request handler manager 210 manages communication to and from request handlers of machine 200. For example, a client/user request to a request handler is received at manager 210 and request handler manager 210 forwards the request to the request handler assigned to the request. Manager 210 may also handle communication to a data handler machine such as a data handler machine in group 106 of FIG. 1. When an update to a centralized version of data is prepared by a request handler, request handler manager 210 stores the prepared update in a data structure to be sent to an appropriate data handler machine. Manager 210 may batch and/or combine updates for the same data and/or the same data handler machine. Manager 210 periodically and/or dynamically sends the prepared updates in the data structure using one or more data handler machine identifiers determined by manager 210.

Figure 2B:
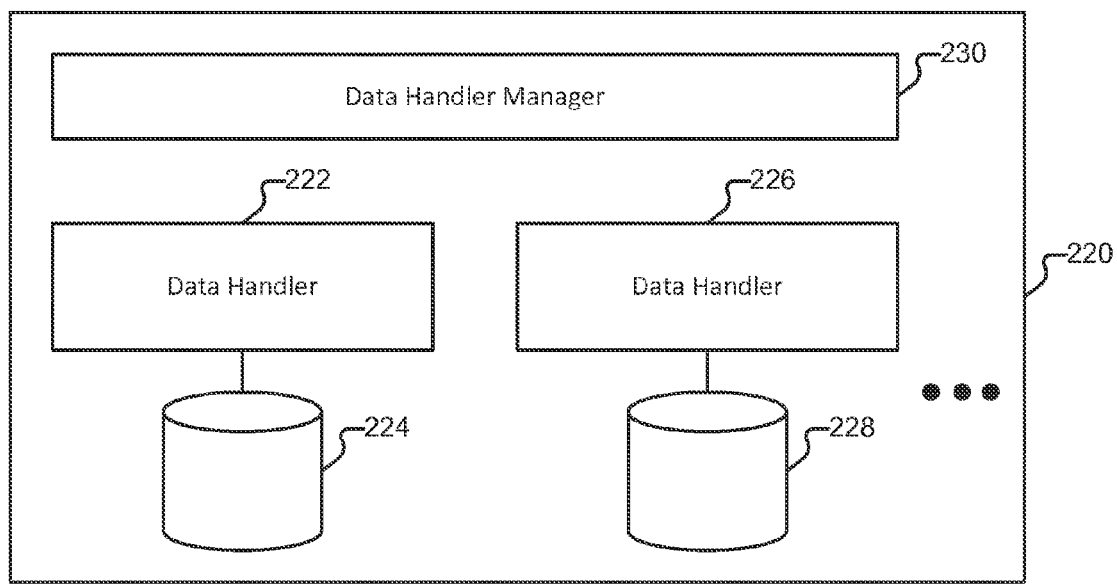
FIG. 2B is a block diagram illustrating an embodiment of a data handler machine.

FIG. 2B is a block diagram illustrating an embodiment of a data handler machine. In some embodiments, data handler machine 220 is included in a data handler machine included in group 106 of FIG. 1. Machine 220 includes a plurality of data handlers, including data handler 222 and data handler 226. Any number of data handlers may exist. Each data handler processes prepared updates or other processing required for data assigned to the data handler. The assignment of data handled by a data handler may be predetermined and/or dynamically determined based on factors such as load balancing and fault tolerance. Each data handler is able to process data and is associated with a local storage such as memory and/or a database. For example, data handler 222 is associated with (e.g., manages) storage 224 and data handler 226 is associated with storage 228. The associated storage may store a copy of the centralized version of data of interest. The centralized version of the data may be protected with a lock to prevent data corruption when the centralized version is being updated. The centralized version of the data is also stored at a data cache such as data cache 112 of FIG. 1 to be used to update one or more locally stored versions of the data. The centralized version of the data may also be backed up. An example of the data handler includes a thread/process that is able to process data and store/retrieve data from the one or more different types of storage.

Data handler manager 230 manages communication to and from data handlers of machine 220. For example, a prepared update for data is received at machine 220 and data handler manager 230 forwards the prepared update to the data handler assigned to the data. In some embodiments, the received prepared update is stored in a data structure before being sent to a data handler. Manager 230 may batch and/or combine prepared updates for the same data from different request handler machines. Manager 230 periodically and/or dynamically sends the prepared updates in the data structure to appropriate data handlers. Manager 230 may also coordinate the storage of the centralized version of the data to a data cache such as data cache 112 and/or a backup storage such as backup storage 114 of FIG. 1.

Figure 3:
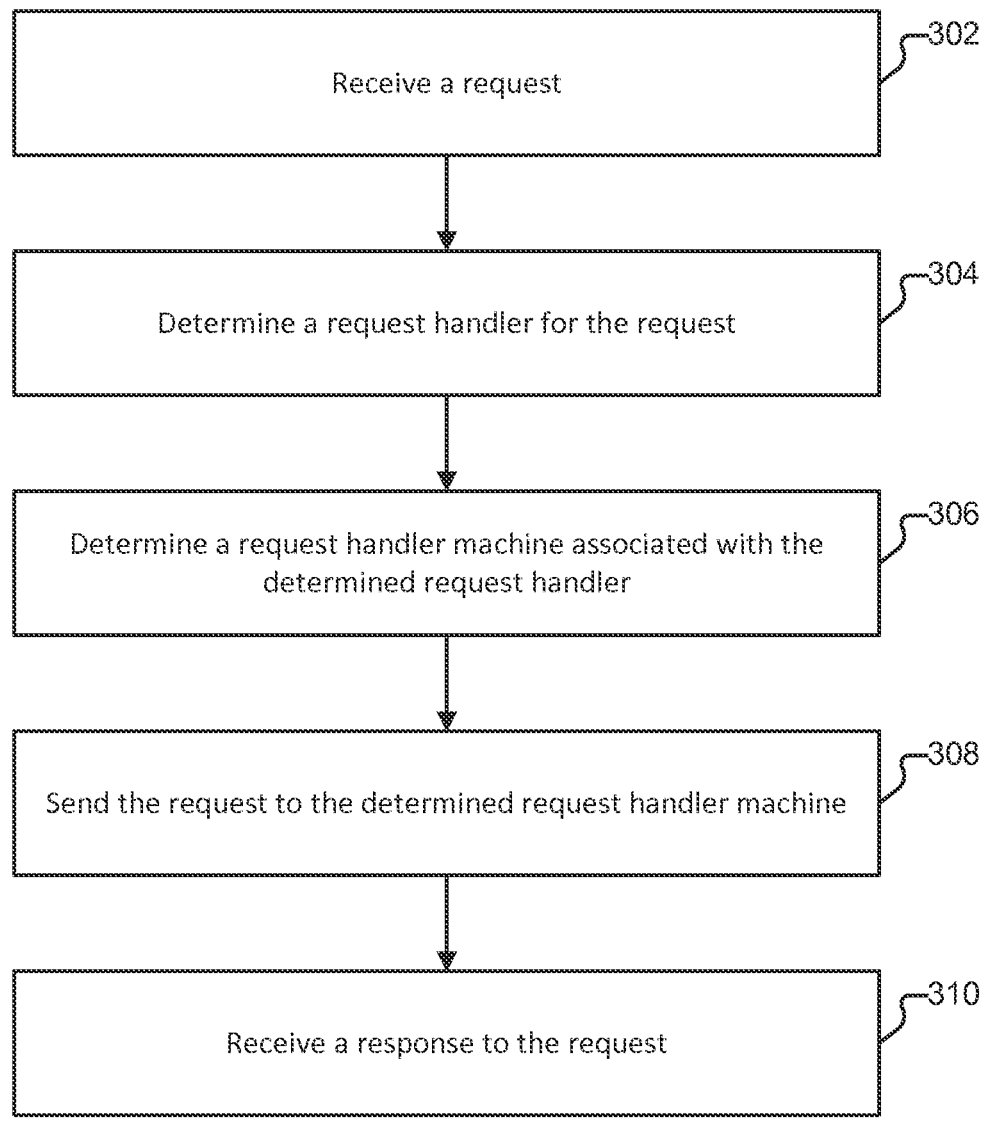
FIG. 3 is a flow chart illustrating an embodiment of a process for processing a request on a client.

FIG. 3 is a flow chart illustrating an embodiment of a process for processing a request on a client. This process may be implemented on a client included in group 102 of FIG. 1.

At 302, a request is received. In some embodiments, the request is received on a client due to a request for content (e.g., content to load on a web page) and/or a user indication (e.g., selection of a content on a web page). In some embodiments, the request includes a request for data. For example, the request includes a request for probability model statistics (e.g., value associated with statistical weight) associated with one or more features (e.g., demographics of a user, time of day, etc.) of an outcome (e.g., selection of a specified advertisement by a user). An example of the probability statistic includes a weight of a feature modeled using any applicable distribution model such as a Gaussian distribution and the probability model statistic such as mean, standard deviation, variance, or any other appropriate statistics are used to describe a distribution representing belief about a given weight of a feature. The statistical weights of one or more features may be combined and mapped using a function such as inverse probit function, logit function, or other link functions to determine a probability of an outcome. In some embodiments, the request includes a request to update data. For example, information about a past outcome associated with one or more features is sent as a request to update statistics associated with the one or more features.

At 304, a request handler for the received request is determined. In some embodiments, the request handler includes request handler 202 or 206 in FIG. 2A. In some embodiments, determining the request handler includes determining a request handler assigned to the request. The request handler may be pre-assigned or dynamically assigned. In some embodiments, the request handler is determined based on an identifier associated with the request (e.g., user identifier, machine identifier, request identifier, transaction identifier, etc.). For example, an identifier of a user associated with the request is used to determine an identifier of a request handler. This may be achieved by evenly distributing the number of users among the number of available request handlers (e.g., user identifier number modulo number of available request handlers). In some embodiments, the request handler is determined dynamically based at least in part on utilization, load balancing, and/or fault tolerance factors.

At 306, a request handler machine associated with the determined request handler is determined. In some embodiments, determining the request handler machine includes determining which request handler machine in group 104 of FIG. 1 hosts the determined request handler. In some embodiments, determining the request handler includes using a request handler machine directory such as directory 108 of FIG. 1. For example, an identifier of the request handler determined in 304 is sent to the request handler machine directory and the directory returns an identifier of a request handler machine hosting the request handler. The request handler machine directory may include a cluster of machines that access a table and/or a database that is dynamically updated with the latest mapping from an identifier of a request handler to a machine hosting/executing the request handler. This mapping may be dynamically modified based on availability, workload, fault tolerance, load balancing of one or more request handlers and/or request handler machines. In some embodiments, determining the request handler machine includes obtaining a cached identifier of a request handler machine associated with the determined request handler. For example, a cache of previously obtained request handler machine identifiers (e.g., from a request handler machine directory) is checked when determining the request handler machine. If the machine identifier exists in the cache, the cached identifier is used. If the machine identifier is not in the cache, the identifier is requested from the request handler machine directory. If a message is received that the used request handler machine identifier is invalid, another identifier of the request handler machine is requested from the request handler machine directory.

At 308, the request is sent to the determined request handler machine (e.g., determined in step 306). In some embodiments, the request is a request to obtain data and the request sent includes one or more of the following: a user identifier, a machine identifier, a data identifier, an identifier of a feature associated with data, and a statistical model identifier. For example, the request includes a string identifier of a subject content (e.g., identifier of an advertisement), a string identifier of a feature associated with the subject content (e.g., sex of a potential advertisement user), a user identifier (e.g., a unique identifier assigned to a user), and a statistical model identifier (e.g., identifier of a statistical model used to generate the data being obtained). In some embodiments, a plurality of requests is sent together. For example, a plurality of statistics associated with different features (e.g., demographical features of a target advertisement viewer) is requested using the request.

In some embodiments, the sent request is a request to update/train data (e.g., due to a past event). The request sent to update/train data may include one or more of the following: a user identifier, a machine identifier, a data identifier, an identifier of a feature associated with data, or a statistical model identifier. For example the request includes a string identifier of a subject content (e.g., identifier of a content displayed to a user), a string identifier of a feature associated with the subject content (e.g., sex of user that displayed the content), a user identifier (e.g., a unique identifier assigned to the user), a statistical model identifier (e.g., identifier of a statistical model to be used to update/train statistical data), and a detected outcome (e.g., data indication whether the content was selected by the user).

At 310, a response to the request is received. For example, if the request included a request to obtain data, the requested data is received. In some embodiments, the received data is used at least in part to determine whether to provide content and/or which content to provide to a user. In some embodiments, if the request included a request to update/train data, a confirmation that the update was successfully received and/or completed is received. In some embodiments, if the request included a request to update/train data, no response is required to be received in 310.

Figure 4:
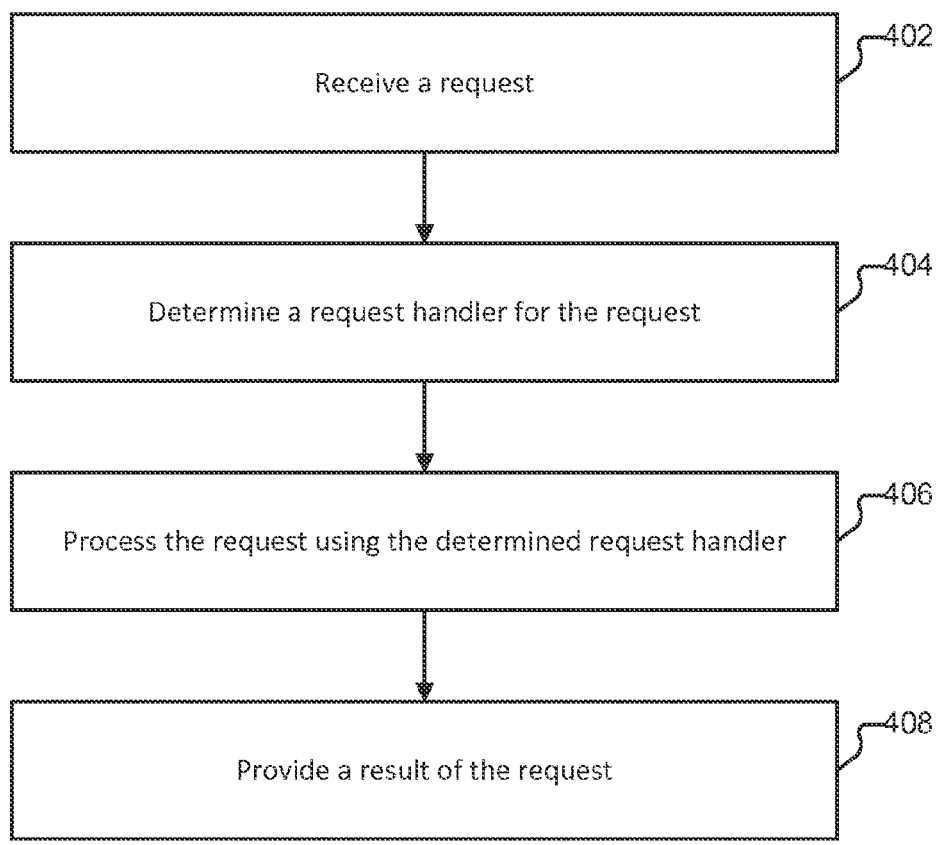
FIG. 4 is a flow chart illustrating an embodiment of a process for processing a request using a request handler.

FIG. 4 is a flow chart illustrating an embodiment of a process for processing a request using a request handler. The process of FIG. 4 may be implemented on a request handler in group 104 of FIG. 1. In some embodiments, the process of FIG. 4 is implemented on one or more components of request handler machine 200 in FIG. 2A.

At 402, a request is received. In some embodiments, the received request is the request sent in step 308 of FIG. 3. In some embodiments, the request is received by a request handler manager (e.g., request handler manager 210 of FIG. 2A) of a request handler machine hosting/executing a request handler that will be processing the request.

At 404, a request handler that will be processing the request is determined. In some embodiments, determining the request handler for the received request includes using an identifier included in the request to map the request to one of one or more request handlers hosted on (e.g., executed using) the request handler machine that received the request. In some embodiments, determining the request handler includes determining a request handler assigned to the request. The request handler may be pre-assigned or dynamically assigned. In some embodiments, the request handler is determined based on an identifier included in the request (e.g., user identifier, machine identifier, request identifier, transaction identifier, etc.). For example, an identifier of a user associated with the request is used to determine an identifier of a request handler. This may be achieved by performing a calculation (e.g., user identifier number modulo number of available request handlers). In some embodiments, the request handler is determined dynamically based at least in part on utilization, load balancing, and/or fault tolerance factors of request handlers hosted on the request handler machine that received the request.

At 406, the request is processed using the determined request handler. In some embodiments, processing the request includes obtaining data requested in the received request. For example, the request may include a request to obtain a statistical value associated with a probability a user of a certain demographic will select certain content. In some embodiments, processing the request includes updating data using information provided in the request. For example, the request includes a request to update a probability model statistic using information about a user selection outcome included in the request. Updating data using information provided in the request may include determining (e.g., using information included in the request) a prepared update to be sent to a data handler (e.g., data handler included in group 106 of FIG. 1) and used by the data handler to update a centralized version of the data identified in the received request. In some embodiments, processing the request includes utilizing a local version of a data stored in a local storage of the request handler processing the request. For example, the data of interest is obtained from and/or updated to a local storage such as storage 204 of FIG. 2A. Data in the local storage may be periodically updated using a centralized version of the data that has been determined using prepared updates determined by one or more request handlers.

At 408, a result of the received request is provided. In some embodiments, providing the result includes providing the result received in 310 of FIG. 3. In some embodiments, step 408 is optional. For example, if the received request includes a request to update data, the send of the request assumes the request has been successfully completed unless an error message is received.

Figure 5:
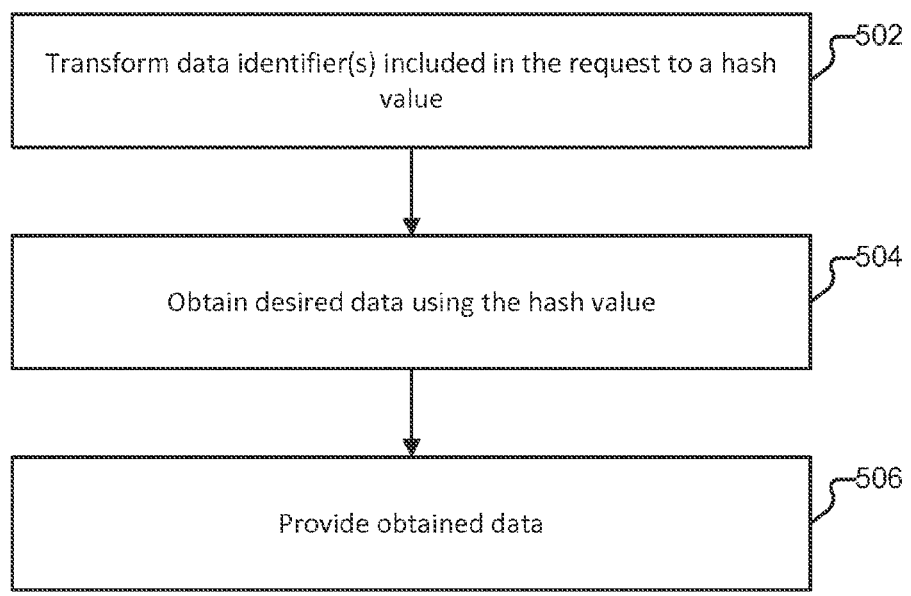
FIG. 5 is a flow chart illustrating an embodiment of a process for processing a request to obtain data.

FIG. 5 is a flow chart illustrating an embodiment of a process for processing a request to obtain data. The process of FIG. 5 may be implemented on a request handler in group 104 of FIG. 1. In some embodiments, the process of FIG. 5 is implemented on request handler 202 and/or 206 of FIG. 2A. In some embodiments, the process of FIG. 5 is included in step 406 of FIG. 4.

At 502, one or more data identifiers included in a request are transformed into a hash value. In some embodiments, the request includes the request received in 402 of FIG. 4. In some embodiments, determining the hash value includes determining a unique hash value that can be used to identify a data of interest (e.g., a unique identifier for a statistical value of interest that has been determined for a feature of a subject content using a specific statistical model). In some embodiments, determining a hash value includes using a hash function to map an input value to a hash value.

In some embodiments, determining the hash value includes determining a hash value for each of one or more of the identifiers included in the request and concatenating the resulting hash values into a single value. For example, the request includes a string identifier of a subject content (e.g., identifier of a content to be displayed to a user), a string identifier of a feature associated with the subject content (e.g., demographics of a user that is to be displayed in the content), and a computation model identifier (e.g., identifier of a desired statistical model used to generate statistical data). In this example, a first hash function is used to generate a first hash value (e.g., 32 bit value) using the feature identifier, a second hash function is used to generate a second hash value (e.g., 32 bit value) using the subject content identifier, and a third hash function is used to generate a third hash value (e.g., 64 bit value) using the computational model identifier. These three hash values may be concatenated to generate a single identifier (128 bit value) for the data of interest. In some embodiments, for a single feature of a given subject content, separate statistical values may be stored and updated by a request handler for each different computation model (e.g., statistical model) being utilized. In some embodiments, the hash function and/or the number of bits of the resulting hash value is selected in a manner that corresponds with the need to reduce hash collisions for a specific value. For example, number of bits in the resulting hash value for a subject content identifier is larger than the number of bits in the resulting hash value for a feature identifier because it is more important to reduce hash collisions for the subject content identifier than the feature identifier. In some embodiments, the hash function and/or the number of bits of the resulting hash value is selected in a manner that corresponds with number of possible unique inputs to a hash function.

At 504, desired data is obtained using the hash value determined in step 502. In some embodiments, obtaining the desired data includes obtaining data from a storage (e.g., memory, table, database, or any other structure for storing information) using the hash value as the identifier of the desired data. The storage may be the local storage of the request handler processing the request in step 406 of FIG. 4. For example, request handler 202 of FIG. 2A is handling the processing required in the process of FIG. 5 and request handler 202 looks up a desired value indexed in storage 204 using the determined hash value. In some embodiments, the hash value has enabled efficient storage, organization, identification and retrieval of the desired data. In some embodiments, the desired data may not be available in the local storage of the request handler. For example, if a look up in the local storage using the hash value is unsuccessful (e.g., does not yet exist in local storage), the desired data is obtained from another storage source, such as a centralized storage (e.g., data cache 112 of FIG. 1). Once the data is obtained from the other storage, the data may be stored in the local storage. In some embodiments, if the desired information does not exist in storage, a predetermined initial value is used.

In some embodiments, before the desired data is obtained from the storage such as storage 204 of FIG. 2A, the desired data is locked using a lock (e.g., synchronization lock) that prevents the data to be obtained from being changed in the storage (e.g., a lock protecting a data in local storage 204 of FIG. 2A). This lock may be released after the desired data is obtained. In some embodiments, acquisition of the lock only prevents a concurrent change to the data of interest and does not prevent concurrent reading of the data of interest.

In some embodiments, the obtained data includes probability model statistics that can be used to determine an outcome prediction. For example, the request includes one or more identifiers of one or more feature variables for a proposed event and the information obtained in response to the request includes stored statistics for each feature variable describing beliefs about the feature value's statistical weight that has been modeled using an applicable distribution model such as a Gaussian distribution. The statistical model weights of one or more features may be combined and mapped using a function such as inverse probit function, logit function or other link functions to determine a probability of an outcome. Examples of the obtained information include a mean value and a variance value. A standard deviation value may be obtained instead of the variance value.

At 506, the obtained data is provided. In some embodiments, providing the obtained data includes preparing the obtained data to be provided in step 408 of FIG. 4.

Figure 6:
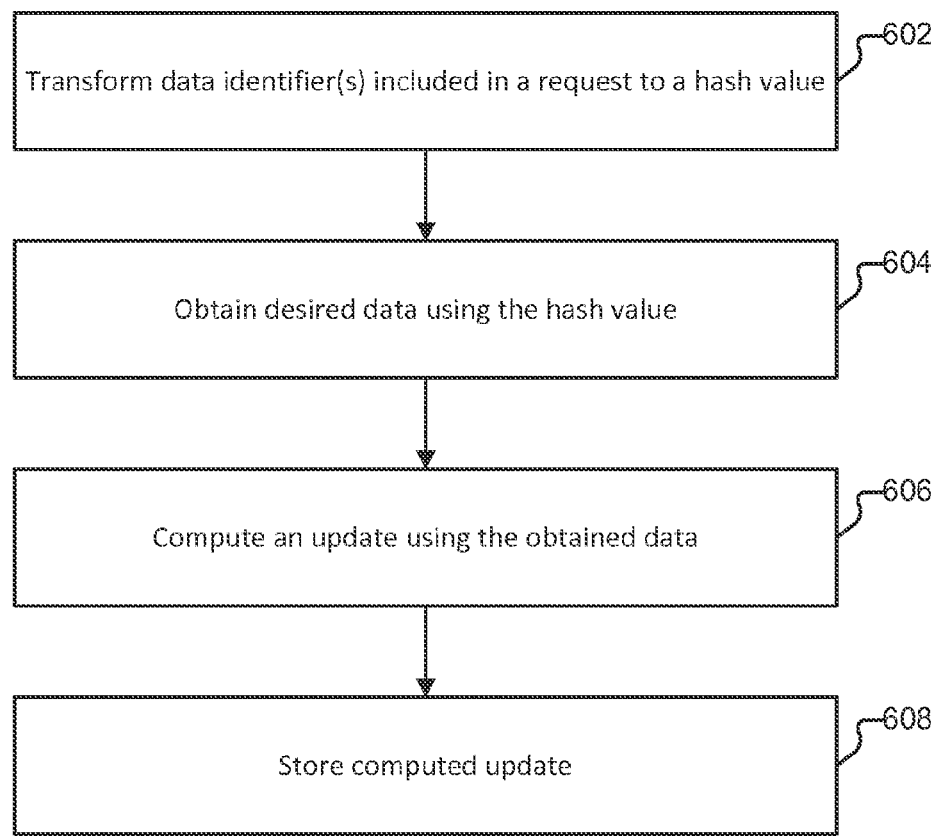
FIG. 6 is a flow chart illustrating an embodiment of a process for processing a request to update data.

FIG. 6 is a flow chart illustrating an embodiment of a process for processing a request to update data. The process of FIG. 6 may be implemented on a request handler in group 104 of FIG. 1. In some embodiments, the process of FIG. 6 is implemented on request handler 202 and/or 206 of FIG. 2A. In some embodiments, the process of FIG. 6 is included in step 406 of FIG. 4.

At 602, one or more data identifiers included in a request are used to determine a hash value. In some embodiments, the request includes the request received in 402 of FIG. 4. In some embodiments, determining the hash value includes determining a hash value that can be used to identify a data being updated (e.g., a unique identifier for a statistical value of interest that has been determined for a feature of a subject content using a specific statistical model). In some embodiments, determining the hash value includes using a hash function to map an input to the hash value.

In some embodiments, determining the hash value includes determining a hash value for each of one or more of the identifiers included in the request and concatenating the resulting hash values into a single value. For example, the request includes a string identifier of a subject content (e.g., identifier of a content to be displayed to a user), a string identifier of a feature associated with the subject content (e.g., demographics of a user that is to be displayed in the content), and a computation model identifier (e.g., identifier of a desired statistical model used to generate statistical data). In this example, a first hash function is used to generate a first hash value (e.g., 32 bit value) using the feature identifier, a second hash function is used to generate a second hash value (e.g., 64 bit value) using the subject content identifier, and a third hash function is used to generate a third hash value (e.g., 32 bit value) using the computational model identifier. These three hash values may be concatenated to generate a single identifier (128 bit value) for the data of interest. In some embodiments, for a single feature of a given subject content, separate statistical values may be stored and updated by a request handler for each different computation model (e.g., statistical model) being utilized. In some embodiments, the hash function and/or the number of bits of the resulting hash is selected in a manner that corresponds with the need to reduce hash collisions for a specific value. For example, number of bits in the resulting hash value for a subject content identifier is larger than the number of bits in the resulting hash value for a feature identifier because it is more important to reduce hash collisions for the subject content identifier than the feature identifier. In some embodiments, the hash function and/or the number of bits of the resulting hash is selected in a manner that corresponds with number of possible unique inputs to the hash function.

At 604, desired data (e.g., data to be updated) is obtained using the hash value determined in step 602. In some embodiments, obtaining the desired data includes obtaining data from a storage (e.g., memory, table, database, or any other structure for storing information) using the hash value as the identifier of the desired data. The storage may be the local storage of the request handler processing the request in step 406 of FIG. 4. For example, request handler 202 of FIG. 2A is handling the processing required in the process of FIG. 5 and request handler 202 looks up a desired value indexed in storage 204 using the determined hash value. In some embodiments, the hash value has enabled efficient storage, organization, identification and retrieval of the desired data. In some embodiments, the desired information may not be available in the local storage of the request handler. For example, if a look up in the local storage using the hash value is unsuccessful (e.g., does not yet exist in local storage), the desired information is obtained from another storage source, such as a centralized storage (e.g., data cache 112 of FIG. 1). Once the data is obtained from the other storage, the data may be stored in the local storage. In some embodiments, if the desired information does not exist in storage, a predetermined initial value is used.

In some embodiments, before the desired data is obtained from the storage such as storage 204 of FIG. 2A, the desired data is locked using a lock (e.g., synchronization lock) that prevents the data to be obtained from being changed in the storage (e.g., a lock protecting a data in local storage 204 of FIG. 2A). This lock may be released after the desired data is obtained. In some embodiments, acquisition of the lock only prevents a concurrent change to the data of interest and does not prevent concurrent reading of the data of interest.

In some embodiments, the obtained information includes probability model statistics that are to be updated using information in a received request to update the data. For example, the obtained data includes a mean value and a variance value describing a belief about a value of a statistical weight of a feature variable modeled using an applicable distribution model such as a Gaussian distribution. The obtained mean and variance values are to be used to calculate an update to the obtained mean and variance values.

At 606, an update is computed using the obtained data. In some embodiments, computing the update includes using Bayes' law to determine the update. Computing the update may include calculating an updated version of the data obtained in step 604. For example, an updated mean value and an updated variance value are calculated using one or more formulas based at least in part on Bayes' law. Example update formulas can be found in patent application Ser. No. 11/835, 985 titled EVENT PREDICTION. In some embodiments, the formula and/or one or more parameter values required in performing the update are obtained from a model version server. The model version server may be provided a hash value (e.g., 32 bit) of a computation model identifier (e.g., identifier of a desired statistical model used to generate statistical data included in the received request) that was determined in step 602 and the model version server provides the formula and/or one or more parameters required to determine the update. The model version server may be a part of a group of model version servers that allows distribution of workload and fault tolerance of the model version servers. Examples of the parameter values obtained from the model version server include a beta value, possible feature variables associated with subject content, and other information required to determine the update.

In some embodiments, computing the update includes determining a differential value that can be used to update a centralized version of the data obtained in step 604. For example, the differential value represents the incremental update to the obtained data due to the update information included in an update request. In some embodiments, this differential value is computed in a form that can be combined with one or more other computed differential values to determine a combined differential value that can be used to update the centralized version of the data obtained in step 604. In some embodiments, the centralized version of the data is associated with data cache 112 of FIG. 1 and/or storage 224 and 228 of FIG. 2B. In some embodiments, the differential value includes a first value (i.e., $\tau$) defined as the new mean value divided by the variance value and a second value (i.e., $\pi$) defined as an inverse of the variance value. The $\tau$ value and the $\pi$ may be used to update a centralized version of a mean value and a variance value stored in storage such as data cache 112 of FIG. 1 and/or storage 224 and 228 of FIG. 2B. A plurality of $\tau$ values may be combined (e.g., added together) to generate a single combined $\tau$ value and a plurality of $\pi$ values may be combined (e.g., added together) to generate a single combined $\pi$ value, and the combined $\tau$ and $\pi$ values can be used to update the centralized version of data.

At 608, the computed update is stored. In some embodiments, storing the update includes storing an updated version of the data obtained in step 604. The updated version of the data may be stored in storage local to a request handler such as storage 204 or 208 of FIG. 2A. Storing the data in the local storage may include storing the data in a manner identifiable by the hash value determined in step 602. In some embodiments, before the data is stored in the local storage, a previous version of the data in the storage is locked using a lock (e.g., synchronization lock) that prevents the data from being obtained or changed in the storage (e.g., a lock protecting a data in local storage 204 of FIG. 2A). This lock may be released after the data is updated.

In some embodiments, storing the update includes preparing a prepared update (e.g., includes a differential value computed in step 606) and storing the prepared update in a data structure (e.g., a queue) for sending to a data handler machine such as a data handler machine in group 106 of FIG. 1 to be used to update a centralized version of the data obtained in step 604. The prepared update may include a hash value determined in step 602, a τ value and a π value. In some embodiments, a request handler sends the prepared update to a request handler manager (e.g., request handler manager 210 of FIG. 2A).

Figure 7:
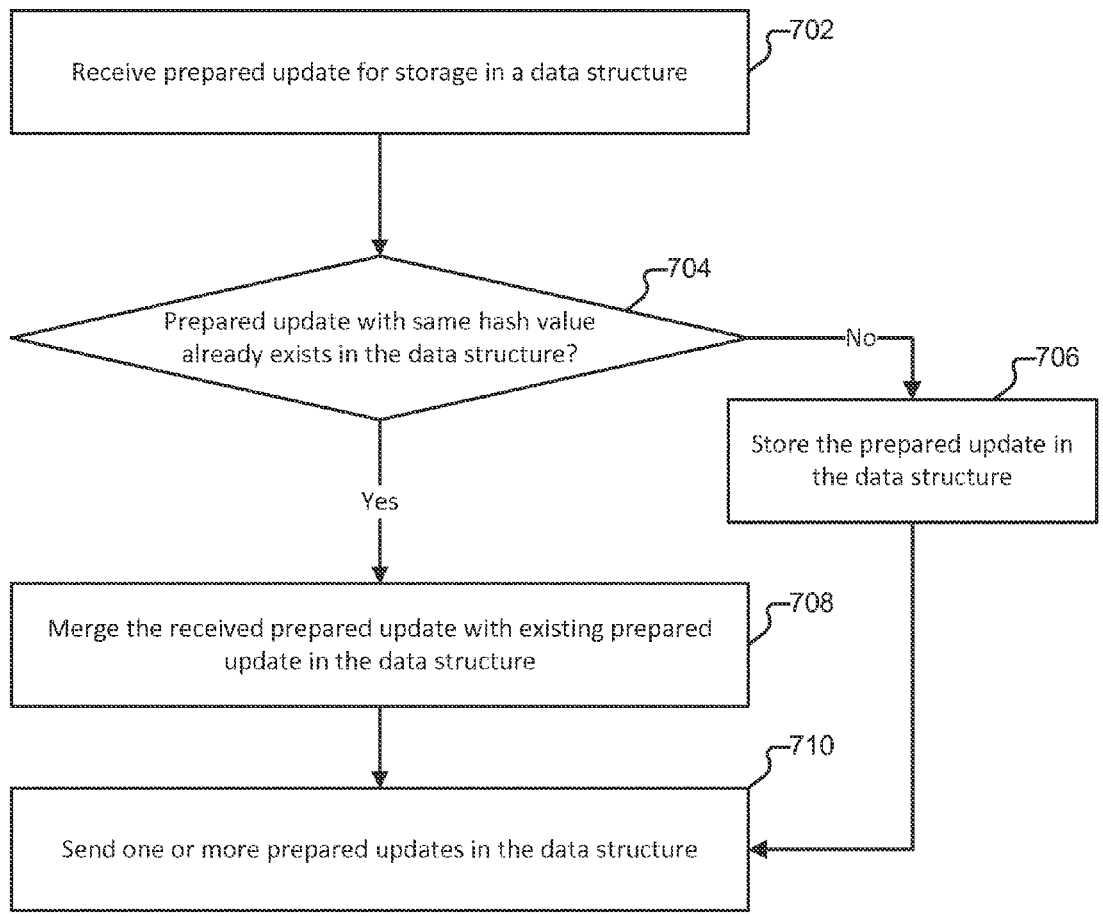
FIG. 7 is a flow chart illustrating an embodiment of a process for storing a prepared update.

FIG. 7 is a flow chart illustrating an embodiment of a process for storing a prepared update. The process of FIG. 7 may be implemented on a request handler manager included in a request handler in group 104 of FIG. 1. In some embodiments, the process of FIG. 7 is implemented on request handler manager of FIG. 2A. In some embodiments, the process of FIG. 7 is included in step 608 of FIG. 6.

At 702, a prepared update is received for storage in a data structure. In some embodiments, the received update includes the prepared update calculated in step 606 of FIG. 6. In some embodiments, the update includes the update in step 608 of FIG. 6. For example, the prepared update includes a hash identifier determined in step 602 of FIG. 6, a τ value and a π value. Examples of a data structure include a queue structure, a table structure, a list structure and any other data structure that is able to store data. The data structure may be managed by a request handler manager of a request handler machine and the data structure may store prepared updates from a plurality of request handlers At 704, it is determined whether the received prepared update is associated with a same hash value that is already associated with another prepared update already stored in the data structure. In some embodiments, determining whether a prepared update associated with a same hash value already exists includes searching existing prepared updates in the data structure to determine whether any of the prepared updates in the data structure include the same hash value as the received prepared update to be stored in the data structure.

If at 704 it is determined that a prepared update associated with a same hash value does not already exist in the data structure, at 706, the received prepared update is stored in the data structure. If at 704 it is determined that a prepared update associated with a same hash value does already exist in the data structure, at 708, the received prepared update is merged with the prepared update in the data structure. In some embodiments, merging the received prepared update includes storing a combined value in the prepared update stored in the storage structure. For example, τ value of the received update is added to the τ value in the stored update and the resulting combined τ value is stored as the new τ value of the stored update. Additionally, the π value of the received update is added to the π value in the stored update and the resulting combined π value is stored as the new π value of the stored update. In some embodiments, by merging the prepared updates, a less number or scaled version of prepared updates have to stored, communicated, and processed. This may result in prepared updates from different request handlers hosted by the same request handler machine to be efficiently combined into a single prepared update.

At 710, one or more prepared updates in the data structure are sent at a determined interval. In some embodiments, the prepared updates are sent to a data handler machine hosting/executing a data handler that will be processing the prepared update. Processing the prepared update may include using the prepared update to update a centralized version of data associated with a hash value included in the prepared update. In some embodiments, the prepared updates are sent at a periodic interval. For example, all updates in the data structure are sent and emptied at a periodic interval. The length of the period interval may be predetermined and/or dynamically determined. In some embodiments, by sending the prepared updates at an interval less frequent than the interval the prepared updates are received for storage in the data structure, it allows prepared updates for the same data by various request handlers hosted on the same machine to be merged and grouped together and allows prepared updates for the same data handler machine to be sent together. In some embodiments, the prepared updates are sent at a dynamical interval. For example, prepared updates are sent when a predetermined threshold number of prepared updates are stored in the data structure.

Figure 8:
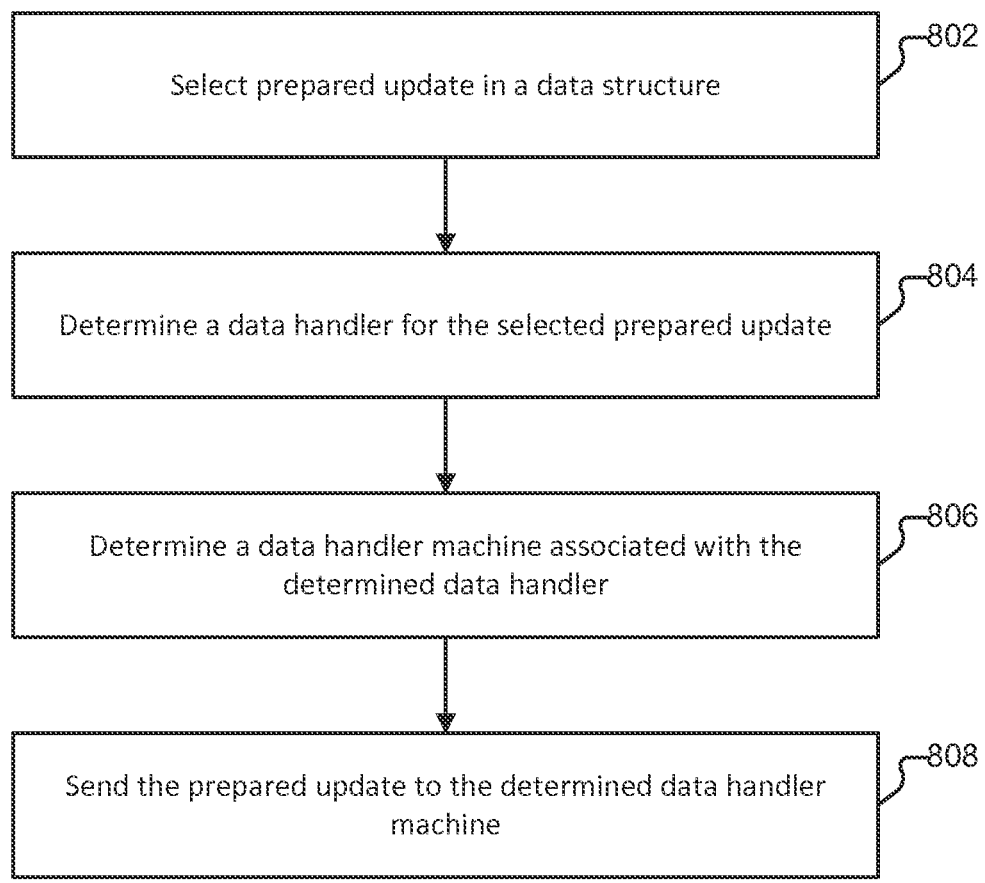
FIG. 8 is a flow chart illustrating an embodiment of a process for sending a prepared update.

FIG. 8 is a flow chart illustrating an embodiment of a process for sending a prepared update. The process of FIG. 8 may be implemented on a request handler manager included in a request handler in group 104 of FIG. 1. In some embodiments, the process of FIG. 8 is implemented on request handler manager of FIG. 2A. In some embodiments, the process of FIG. 8 is included in step 710 of FIG. 7.

At 802, a prepared update in a data structure is selected. In some embodiments, the prepared update may be selected based on a first in first out order, a first in last out order, randomly, and/or selected based on contents of the prepared update.

At 804, a data handler for the prepared update is determined. In some embodiments, the data handler includes data handler 222 or 226 in FIG. 2B. In some embodiments, determining the data handler includes determining a data handler assigned to the data to be updated using the prepared update. The data handler may be pre-assigned or dynamically assigned. In some embodiments, the data handler is determined based on a hash value included in the prepared update. For example, the hash value is used to determine an identifier of a data handler. This may be achieved by evenly distributing the number of existing hash values among the number of available data handlers (e.g., hash value modulo number of available data handlers). In some embodiments, the data handler is determined dynamically based at least in part on utilization, load balancing, and/or fault tolerance factors.

At 806, a data handler machine associated with the determined data handler is determined. In some embodiments, determining the data handler machine includes determining which data handler machine in group 106 of FIG. 1 hosts the determined data handler. In some embodiments, determining the data handler machine includes using a data handler machine directory such as directory 110 of FIG. 1. For example, an identifier of the data handler determined in 804 is sent to the data handler machine directory and the directory returns an identifier of a data handler machine hosting the data handler. The data handler machine directory may include a cluster of machines that each store a table and/or a database that is dynamically updated with the latest mapping from an identifier of a data handler to a machine hosting/executing the data handler. This mapping may be dynamically modified based on availability, workload, fault tolerance, load balancing of one or more data handlers and/or data handler machines. In some embodiments, determining the data handler machine includes obtaining a cached identifier of a data handler machine associated with the determined data handler identifier. For example, a cache of previously obtained data handler machine identifiers (e.g., from a data handler machine directory) is checked when determining the data handler machine. If the machine identifier exists in the cache, the cached identifier is used. If the machine identifier is not in the cache, the identifier is requested from the data handler machine directory. If a message is received that the used data handler machine identifier is invalid, another identifier of the data handler is requested from the data handler machine directory. In other embodiments, the hash value is directly used instead of a data handler identifier. For example, step 804 is optional and the data handler machine directory provides a data handler machine identifier using a provided hash value.

At 808, the prepared update is sent to the machine determined in 806. This may include sending the prepared update using the determined machine identifier. In some embodiments, a plurality of prepared updates to be sent to a particular data handler machine is batched together and sent together. For example, a data handler machine identifier is determined for prepared updates in the data structure, and prepared updates to be sent to the same data handler machine are batched together to be sent together at a period when updates are sent. The determination of the data handler machine for a prepared update in the data structure may be determined when the prepared update is placed in the data structure, as processing resources become available, at a periodic processing interval, and/or when the prepared update is being processed to be sent.

Figure 9:
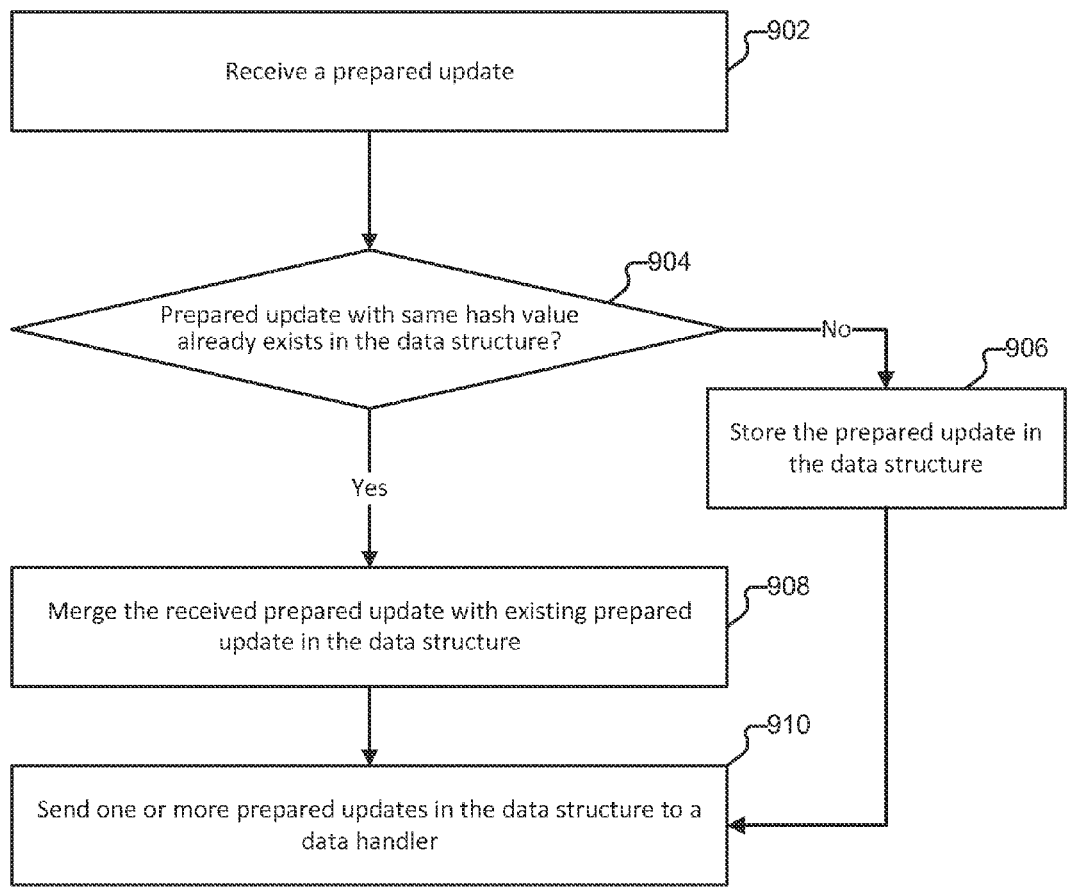
FIG. 9 is a flow chart illustrating an embodiment of a process for receiving a prepared update in a receiving data structure.

FIG. 9 is a flow chart illustrating an embodiment of a process for receiving a prepared update in a receiving data structure. The process of FIG. 9 may be implemented on a data handler manager such as data handler manager 230 of FIG. 2B.

At 902, a prepared update is received. In some embodiments, the prepared update is the prepared update sent in step 808 of FIG. 8. For example, the prepared update is received from a sending data structure of a request handler machine that has combined prepared updates from a plurality of request handlers hosted on the data handler machine. The received prepared update is to be potentially stored in another data structure on a data handler machine that has received the prepared update. In some embodiments, by storing received prepared updates in a data structure on the receiving data handler machine, prepared updates for the same data from different request handler machines can be merged into a single prepared update for efficient processing by a destination data handler.

At 904, it is determined whether the received prepared update is associated with a same hash value that is already associated with another prepared update already stored in the data structure. In some embodiments, determining whether a prepared update associated with the same hash value already exists in the data structure includes searching existing prepared updates in the data structure of the data handler manager to determine whether any of the prepared updates in the data structure contain the same hash value as the received prepared update.

If at 904 it is determined that a prepared update associated with the same hash value does not already exist in the data structure, at 906, the received prepared update is stored in the data structure. If at 904 it is determined that a prepared update associated with the same hash value does already exist in the data structure, at 908, the received prepared update is merged with the prepared update in the data structure. In some embodiments, merging the received prepared update includes storing a combined value in the prepared update stored in the storage structure. For example, $\tau$ value of the received update is added to the $\tau$ value in the stored update and the resulting combined $\tau$ value is stored as the new $\tau$ value of the stored update. Additionally, the $\pi$ value of the received update is added to the $\pi$ value in the stored update and the resulting combined $\pi$ value is stored as the new $\pi$ value of the stored update. This may result in prepared updates from different request handler machines for the same data to be efficiently combined into a single prepared update.

At 910, one or more prepared updates in the data structure are sent at a determined interval to a data handler for processing. In some embodiments, the prepared updates are sent to a data handler that has been assigned to process the prepared update. In some embodiments, the same data handler will be assigned to process prepared updates for the same data. For example, prepared updates associated with the same hash value identifier will be assigned to the same data handler. In some embodiments, determining which data handler will be processing a given prepared update includes determining a data handler assigned to data to be updated using the prepared update. The data handler may be pre-assigned or dynamically assigned. In some embodiments, the data handler is determined based on a hash value included in the prepared update. For example, the hash value is used to determine an identifier of a data handler. This may be achieved by evenly distributing the number of existing hash values among the number of available data handlers (e.g., hash value modulo number of available data handlers). In some embodiments, the data handler is determined dynamically based at least in part on utilization, load balancing, and/or fault tolerance factors.

In some embodiments, the prepared updates in the data structure are sent at a periodic interval. For example, updates in the data structure of the data handler machine are sent and emptied at a periodic interval. The length of the periodic interval may be predetermined and/or dynamically determined. In some embodiments, by sending the prepared updates at an interval less frequent than the interval the prepared updates are received at the data structure, it allows prepared updates for the same data from various request handler machines to be merged and also allows grouping together of prepared updates to be sent to the same data handler. In some embodiments, the prepared updates are sent at a dynamical interval. For example, prepared updates are sent when a predetermined threshold number of prepared updates are stored in the data structure.

Figure 10:
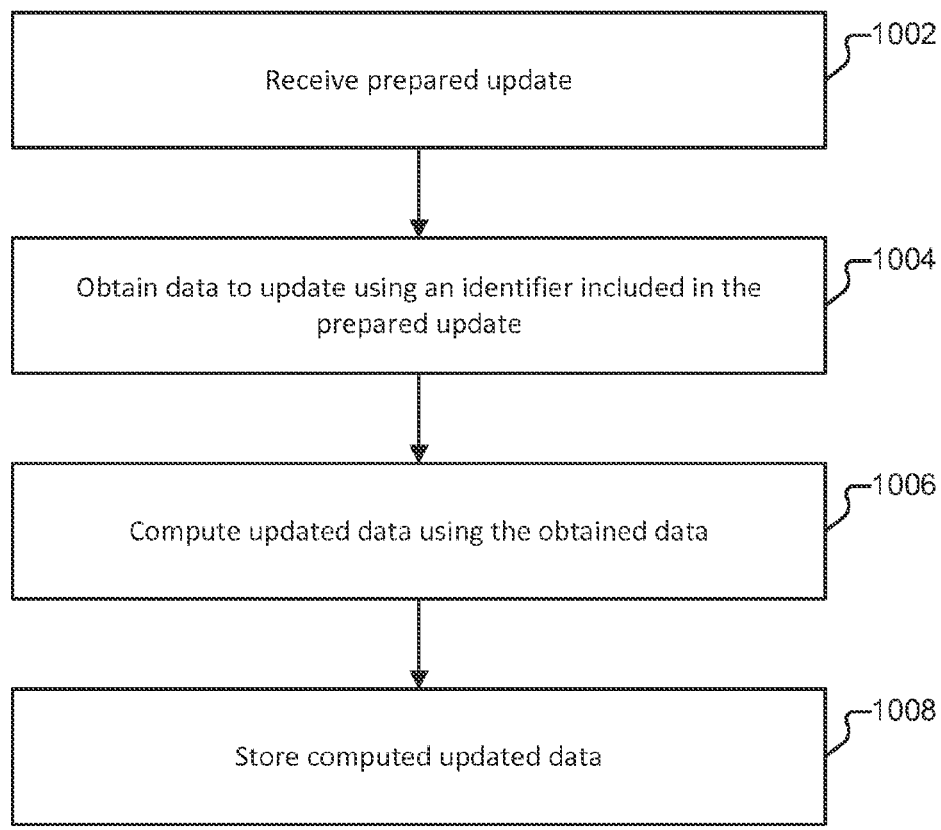
FIG. 10 is a flow chart illustrating an embodiment of a process for using a prepared update to update data.

FIG. 10 is a flow chart illustrating an embodiment of a process for using a prepared update to update data. The process of FIG. 10 may be implemented on a data handler of a data handler machine in group 106 of FIG. 1. In some embodiments, the process of FIG. 10 is implemented on data handler 222 and/or 226 of FIG. 2B.

At 1002, a prepared update to be processed is received. In some embodiments, the received prepared update includes the prepared update sent in step 910 of FIG. 9.

At 1004, data to be updated is obtained using an identifier included in the prepared update. In some embodiments, the identifier included in the update includes a hash value such as the hash value determined in step 602 of FIG. 6. In some embodiments, obtaining the data includes obtaining data from a storage (e.g., memory, table, database, or any other structure for storing information) using the hash value as the identifier of the desired data. The storage may be the local storage of the data handler processing the prepared update. For example, data handler 222 of FIG. 2B is handling the processing and data handler 222 looks up a data indexed in storage 224 using the hash value. In some embodiments, the desired information may not be available in the local storage of the data handler. For example, if a look up in the local storage using the hash value is unsuccessful (e.g., does not yet exist in local storage), the data to be updated is obtained from another storage source, such as a centralized storage (e.g., data cache 112 of FIG. 1). Once the data is obtained from the other storage, the data may be stored in the local storage of the data handler. In some embodiments, if the data to be updated does not exist in storage, a predetermined initial value is used.

In some embodiments, the obtained information includes probability model statistics that are to be updated using the prepared update. For example, the obtained data includes mean and variance statistics describing a belief about a value of a statistical weight of a feature variable modeled using an applicable distribution model such as a Gaussian distribution. The obtained mean value and variance value are to be used to calculate new mean and variance values.

At 1006, an updated data is computed using the obtained data. In some embodiments, computing the updated data includes using Bayes' law to determine the update. Computing the updated data may include calculating an updated version of the data obtained in step 1004. For example, an updated mean value and an updated variance value are calculated using one or more formulas based at least in part on Bayes' law. Example update formulas can be found in patent application Ser. No. 11/835,985 titled EVENT PREDICTION. In some embodiments, the formula and/or one or more parameter values required in performing the update are obtained from a model version server. The model version server may be provided a hash value (e.g., 64 bit) of a computation model identifier (e.g., identifier of a desired statistical model used to generate statistical data included in the received request) included in the prepared update and the model version server provides the formula and/or one or more parameters required to determine the update. In some embodiments, a τ value and a π value included in the prepared update are used to determine an updated mean value and an updated variance value of data obtained in step 1004.

In some embodiments, computing the updated data includes adjusting the obtained data based on a time factor. For example, when computing the updated data, the obtained data is adjusted based on a data aging factor. In some embodiments, adjusting the obtained data includes adjusting an obtained variance value by utilizing a dynamics value to increase the variance value over an elapsed time. Additional background information on dynamics may be obtained from a reference entitled WEB-SCALE BAYESIAN CLICK-THROUGH RATE PREDICTION FOR SPONSORED SEARCH ADVERTISING IN MICROSOFT'S BING SEARCH ENGINE (Proceedings of the 27th International Conference on Machine Learning (ICML-10), Jun. 21-24, 2010, Haifa, Israel 13-20). In some embodiments, one or more parameters required to compute an updated version of the obtained data may be obtained from a model version server.

At 1008, the computed updated data is stored. The updated version of the data may be stored in storage local to a data handler such as storage 224 or 228 of FIG. 2B. Storing the data in the local storage may include storing the data as data that is identified by the hash value included in the prepared update. In some embodiments, storing the updated data includes storing an identifier of a version (e.g., version identifier, time stamp, etc.) of the updated data. This version identifier may be used in determining whether the updated data has been synchronized/sent to another storage such as a backup storage (e.g., backup storage 114 of FIG. 1), a centralized data cache (e.g., data cache 112 of FIG. 1), and/or a local storage of a request handler (e.g., storage 204 and/or 208 of FIG. 2A).

In some embodiments, storing the updated data includes storing the updated data in a centralized storage (e.g., data cache 112 of FIG. 1) that can be used to update local versions of the data stored in local storage (e.g., storage 204 and/or 208 of FIG. 2A). When the centralized storage is updated, the data being updated in the centralized storage may be locked to prevent other writes and/or reads of the data. In some embodiments, updated data in the centralized storage is periodically pushed to and/or pulled from one or more appropriate request handlers to update corresponding local version(s) of the data in the request handler's local storage. The rate of update of the request handler local storage may be predetermined and/or dynamically determined. For example, the rate of update is at a less frequent interval than the rate at which the request handlers are processing requests to update the data. In some embodiments, when the local storage is being updated using data from the centralized storage, the data being updated is locked to prevent other writes and reads of the data.

In some embodiments, if a data handler and/or a data handler machine experiences a failure or otherwise needs to replaced, a replacement data handler and/or data handler machine may obtain the latest version of relevant data from the centralized storage and/or a backup storage. In some embodiments, storing the updated data includes storing the updated data in a backup storage (e.g., backup storage 114 of FIG. 1). The backup storage may be used to restore data in case of failure and/or used to archive previous versions of the data.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for processing a request, comprising:
a communication interface configured to receive a request associated with an associated identifier; and
a processor configured to:
select among a group of request handlers a selected request handler to process the request, wherein the selection of the selected request handler is based at least in part on the associated identifier; and
process the request using an included identifier included in the request,
wherein processing the request includes using a local version of a data associated with the included identifier and stored in a storage managed by the selected request handler,
processing the request includes determining a hash value using at least the included identifier and using the hash value to obtain the local version of the data,
the local version of the data has been updated using a centralized version of the data,
the centralized version of the data has been determined using processing performed at least by a plurality of request handlers included in the group of request handlers, and
the centralized version of the data has been determined using processing performed at least by the selected request handler.

2. The system of claim 1, wherein the request includes a request to obtain the data.

3. The system of claim 1, wherein the request includes a request to update the data.

4. The system of claim 1, wherein the request has been addressed to the system using a machine identifier obtained from a directory server that maps an identifier of the selected request handler to the machine identifier.

5. The system of claim 1, wherein the associated identifier includes a user identifier.

6. The system of claim 1, wherein the selected request handler has been selected at least in part by performing a module operation using the associated identifier.

7. The system of claim 1, wherein determining the hash value includes determining a first hash value component using the included identifier as an input to a first hash function, determining a second hash value component using a third identifier included in the request as an input to a second hash function, and combining at least the first hash value component and the second hash value component to determine the hash value.

8. The system of claim 1, wherein the processing the request includes computing an updated version of the data.

9. The system of claim 8, wherein computing the updated version includes using a parameter provided by a model version server using a model version identifier included in the request.

10. The system of claim 1, wherein the processing the request includes determining a prepared update to be used to update the centralized version of the data.

11. The system of claim 10, wherein the prepared update includes a differential value that can be used to update the centralized version of the data, and the differential value represents an incremental update to the data associated with the received request.

12. The system of claim 10, wherein processing the request includes placing the prepared update in a data structure, and one or more prepared updates in the data structure is sent to be used to update the centralized version of the data.

13. The system of claim 10, wherein processing the request includes merging the prepared update with another prepared update in a data structure.

14. The system of claim 1, wherein the data is associated with a Bayesian inference algorithm.

15. The system of claim 1, wherein the data includes a mean value and a variance value.

16. The system of claim 1, wherein the plurality of request handlers associated with the centralized version is hosted on a plurality of machines.

17. The system of claim 1, wherein the group of request handlers is hosted on a single machine.

18. A method for processing a request, comprising:
receiving a request associated with an associated identifier;
using a processor to select among a group of request handlers a selected request handler to process the request, wherein the selection of the selected request handler is based at least in part on the associated identifier; and
processing the request using an included identifier included in the request,
wherein processing the request includes using a local version of a data associated with the included identifier and stored in a storage managed by the selected request handler,
processing the request includes determining a hash value using at least the included identifier and using the hash value to obtain the local version of the data,
the local version of the data has been updated using a centralized version of the data,
the centralized version of the data has been determined using processing performed at least by a plurality of request handlers included in the group of request handlers, and
the centralized version of the data has been determined using processing performed at least by the selected request handler.

19. A computer program product for processing a request, the computer program product being embodied in a tangible non-transitory computer readable storage medium and comprising computer instructions for:
receiving a request associated with an associated identifier;
selecting among a group of request handlers a selected request handler to process the request, wherein the selection of the selected request handler is based at least in part on the first associated identifier; and
processing the request using an included identifier included in the request,
wherein processing the request includes using a local version of a data associated with the included identifier and stored in a storage managed by the selected request handler,
processing the request includes determining a hash value using at least the included identifier and using the hash value to obtain the local version of the data,
the local version of the data has been updated using a centralized version of the data,
the centralized version of the data has been determined using processing performed at least by a plurality of request handlers included in the group of request handlers, and
the centralized version of the data has been determined using processing performed at least by the selected request handler.

20. The method of claim 18, wherein the processing the request includes determining a prepared update to be used to update the centralized version of the data.

* * * * *